(12) United States Patent
Gunasekaran et al.

(10) Patent No.: US 12,466,540 B1
(45) Date of Patent: Nov. 11, 2025

(54) SKIN ACTUATED MORPHING WING

(71) Applicant: University of Dayton Research Institute, Dayton, OH (US)

(72) Inventors: Sidaard Gunasekaran, Dayton, OH (US); Julian Pabon, Dayton, OH (US); Jielong Cai, Dayton, OH (US)

( * ) Notice: Subject to any disclaimer, the term of this patent is extended or adjusted under 35 U.S.C. 154(b) by 0 days.

(21) Appl. No.: 18/985,466

(22) Filed: Dec. 18, 2024

Related U.S. Application Data

(60) Provisional application No. 63/611,253, filed on Dec. 18, 2023.

(51) Int. Cl.
*B64C 3/48* (2006.01)
*B64C 3/52* (2006.01)

(52) U.S. Cl.
CPC . *B64C 3/48* (2013.01); *B64C 3/52* (2013.01)

(58) Field of Classification Search
CPC ............... B64C 3/44; B64C 3/48; B64C 3/52
See application file for complete search history.

(56) References Cited

U.S. PATENT DOCUMENTS

| | | | | |
|---|---|---|---|---|
| 1,312,571 | A * | 8/1919 | Parker | B64C 3/48 244/219 |
| 9,944,356 | B1 * | 4/2018 | Wigley | B64C 3/48 |
| 10,577,076 | B1 * | 3/2020 | Wylonis | B64C 3/185 |
| 2022/0126979 | A1 * | 4/2022 | Colombiès | B64C 3/182 |

* cited by examiner

*Primary Examiner* — Joshua J Michener
*Assistant Examiner* — Colin Zohoori
(74) *Attorney, Agent, or Firm* — Thomas E. Lees, LLC

(57) ABSTRACT

A wing comprises a skin shaped like an airfoil and includes a length and an interior. A latching structure is coupled to the interior of the skin and includes a T-shaped structure. Further, a first motor couples to a first rod, near a top of the skin, that spans at least a portion of the length of the skin. A second rod spans at least a portion of the length of the skin and is near a bottom of the skin. A rigid leading edge disposed in the interior of the outer skin and includes a T-shaped hollow corresponding to the T-shaped structure of the latching structure, which limits the skin from buckling when the first motor is activated.

16 Claims, 4 Drawing Sheets

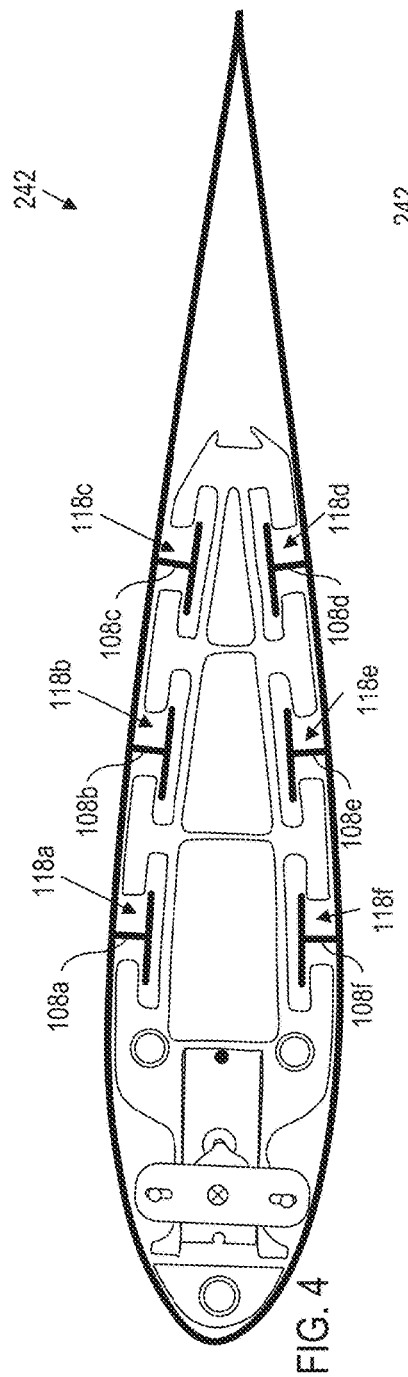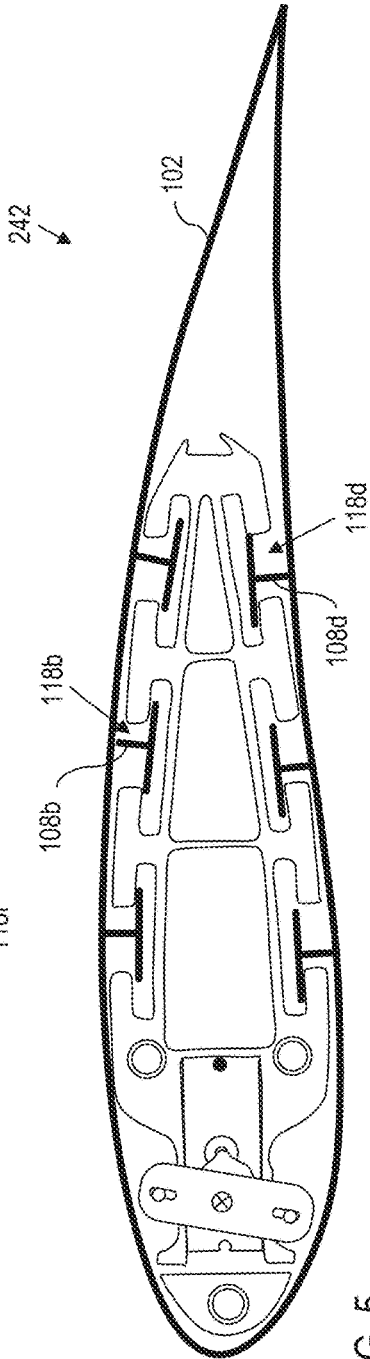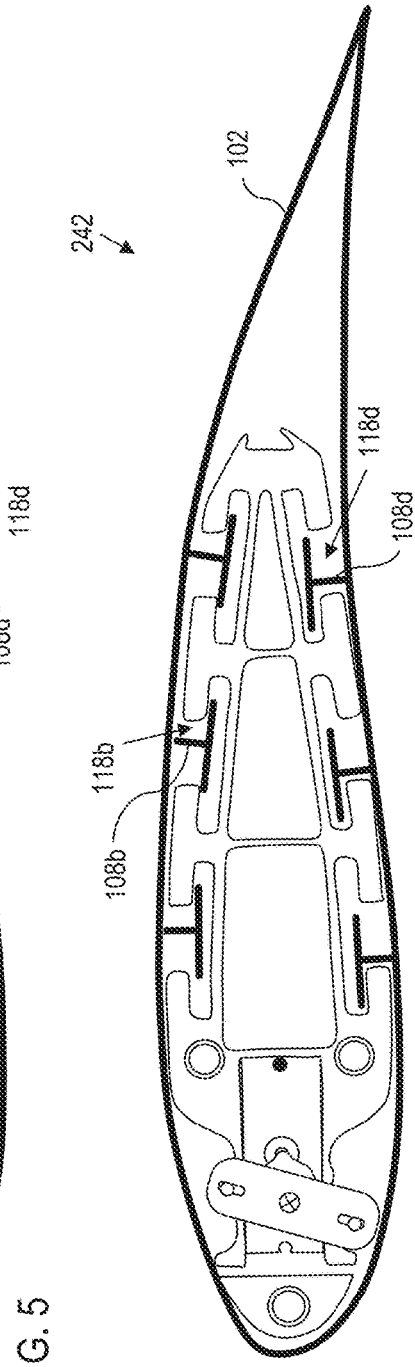

SKIN ACTUATED MORPHING WING

CROSS REFERENCE TO RELATED APPLICATIONS

This application claims the benefit of U.S. Provisional Patent Application Ser. No. 63/611,253, filed Dec. 18, 2023, entitled "SKIN ACTUATED MORPHING WING" by Gunasekaran et al., the disclosure of which is hereby incorporated by reference.

BACKGROUND

Various aspects of the present disclosure relate generally to an airfoil and specifically to a morphing airfoil for an airplane wing.

Airfoils are used to generate lift. For example, an airfoil may be used on fixed-wing aircraft, UAVs (unmanned aerial vehicles), eVTOL (electric vertical take-off and landing) aircraft, sailboat hydrofoils, submarines, automobile spoilers, wind turbines, propellers, helicopter blades, etc.

BRIEF SUMMARY

According to aspects of the present disclosure, a wing comprises a skin shaped like an airfoil and includes a length and an interior. A latching structure is coupled to the interior of the skin and includes a T-shaped structure. Further, a first motor couples to a first rod, near a top of the skin, that spans at least a portion of the length of the skin. A second rod spans at least a portion of the length of the skin and is near a bottom of the skin. A rigid leading edge disposed in the interior of the outer skin and includes a T-shaped hollow corresponding to the T-shaped structure of the latching structure, which limits the skin from buckling when the first motor is activated.

In various embodiments, the wing includes a second motor coupled to the first and second rods.

According to further aspects of the present disclosure, a segment of a wing comprises a skin shaped like an airfoil and includes a length and an interior. A latching structure is coupled to the interior of the skin and includes a T-shaped structure. Further, a first motor couples to a first rod, near a top of the skin, that spans at least a portion of the length of the skin. A second rod spans at least a portion of the length of the skin and is near a bottom of the skin. A rigid leading edge disposed in the interior of the outer skin and includes a T-shaped hollow corresponding to the T-shaped structure of the latching structure, which limits the skin from buckling when the first motor is activated.

In various embodiments, the section of the wing includes a second motor coupled to the first and second rods.

BRIEF DESCRIPTION OF THE SEVERAL VIEWS OF THE DRAWINGS

FIG. 4 is a cross sectional view of an embodiment of the wing of FIG. 1 with the motors at a zero-degree deflection, according to various aspects of the present disclosure;

FIG. 5 is a cross sectional view of the embodiment of the wing of FIG. 4 with the motors at a twenty-degree deflection, according to various aspects of the present disclosure; and FIG. 6 is a cross sectional view of the embodiment of the wing of FIGS. 4-5 with the motors at a thirty-degree deflection, according to various aspects of the present disclosure.

DETAILED DESCRIPTION

Figure 1:
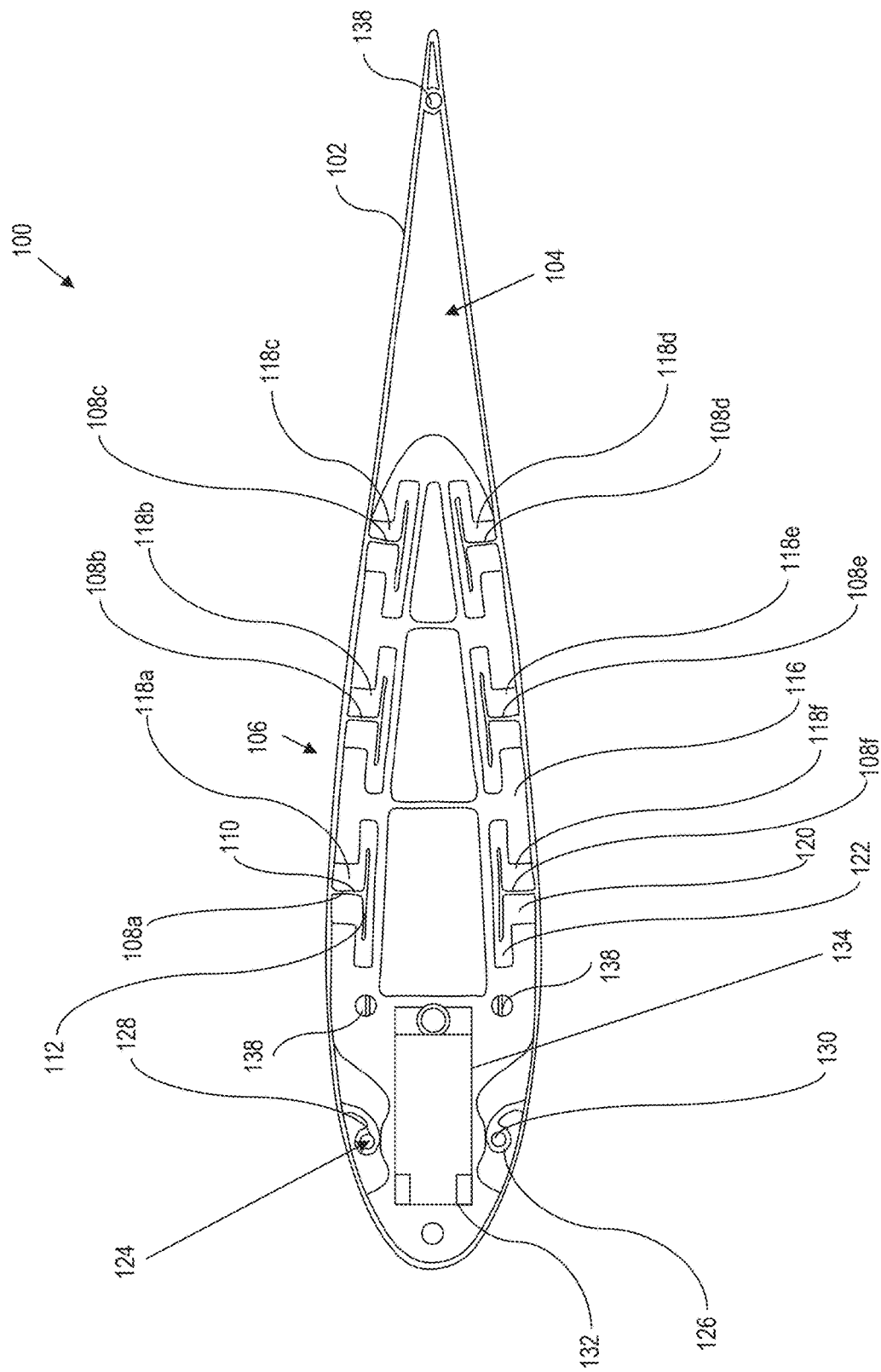
FIG. 1 is a cross-sectional view of a wing, according to various aspects of the present disclosure.

Turning to FIG. 1, a cross section of a skin-actuated morphing wing 100 is shown. The wing 100 includes a skin 102 shaped like an airfoil including an interior 104. The interior 104 of the skin 102 includes a latching structure 106 coupled to the interior 104. Further, the latching structure 106 includes a T-shaped structure 108a-f (collectively 108). While the embodiment of FIG. 1 includes six T-shaped structures 108, any number of T-shaped structures 108 may be used. The T-shaped structures 108 include a stem 110 and a crossbar 112. The stem 110 and crossbar 112 are only labeled on one T-shaped structure for clarity in the figure.

Moreover, a rigid leading edge structure 116 is disposed within the interior 106 of the skin 102. The rigid leading edge structure 116 includes T-shaped hollows 118a-f (collectively 118) that correspond to the T-shaped structures 108 (including a stem hollow 120 and a cross hollow 122; again, only one stem hollow and cross hollow is labeled for clarity), including enough room for the T-shaped hollows 118 to deform. Further, the insert structure 116 includes a first rod mount 124 and a second rod mount 126 that provide space for a first rod 128 and a second rod 130. The rods 128, 130 are coupled to a first motor (e.g., a servo motor) that is mounted to a mounting area 132. In some embodiments, a second motor is also mounted to the mounting area 132 and couples to the first and second rods 128, 130. The motors rotate the rods 128, 130 around a point 134, resulting in skin 102 actuation and enabling the change of a camber of the wing 100, such that an effective camber of the wing 100 can be achieved up to five degrees in either direction. Note that the amount that the motors rotate the rod is related to the change in camber of the wing in a non-linear relationship (not necessarily a 1:1 relationship).

The rigid leading edge structure 116 along with the T-shaped structures 108 and T-shaped hollows 118 evenly distribute the change of camber, which prevents the skin 102 from detaching or buckling (inward, outward, or both) without adding extra thickness to the skin 102.

Further, the rigid leading edge structure 116 keeps a leading edge of the skin 102 rigid and dictates where the skin 102 begins to deform when there is a change in camber. Also, the rigid leading edge structure 116 includes mounting holes 138 to mount the wing 100 to a device (e.g., a fuselage of an aircraft; rotor; another segment of the wing; a test block, etc.).

The morphing wing 100 allows for a smooth transition on the wing surface when changing the camber of the wing, resulting in higher aerodynamic efficiency compared to a traditional rigid trailing-edge device. Further, this provides an advantage over existing morphing wing solutions. For example, existing morphing wing designs can achieve camber morphing. However, many of those designs require a discontinuous lower surface, suffer from buckling issues on the skin, or both, which may increase drag compared to the rigid trailing edge device, so the benefits of a cambered wing are lost in existing designs. On the other hand, embodiments of the wing 100 described herein have a continuous skin (e.g., do not include a discontinuous lower surface) without buckling issues (provided by the rigid leading edge structure 116 and the latching structure 108). The internal structure 116 gives the skin 102 a limited morph capability, which prevents buckling of the skin 102.

Figure 2:
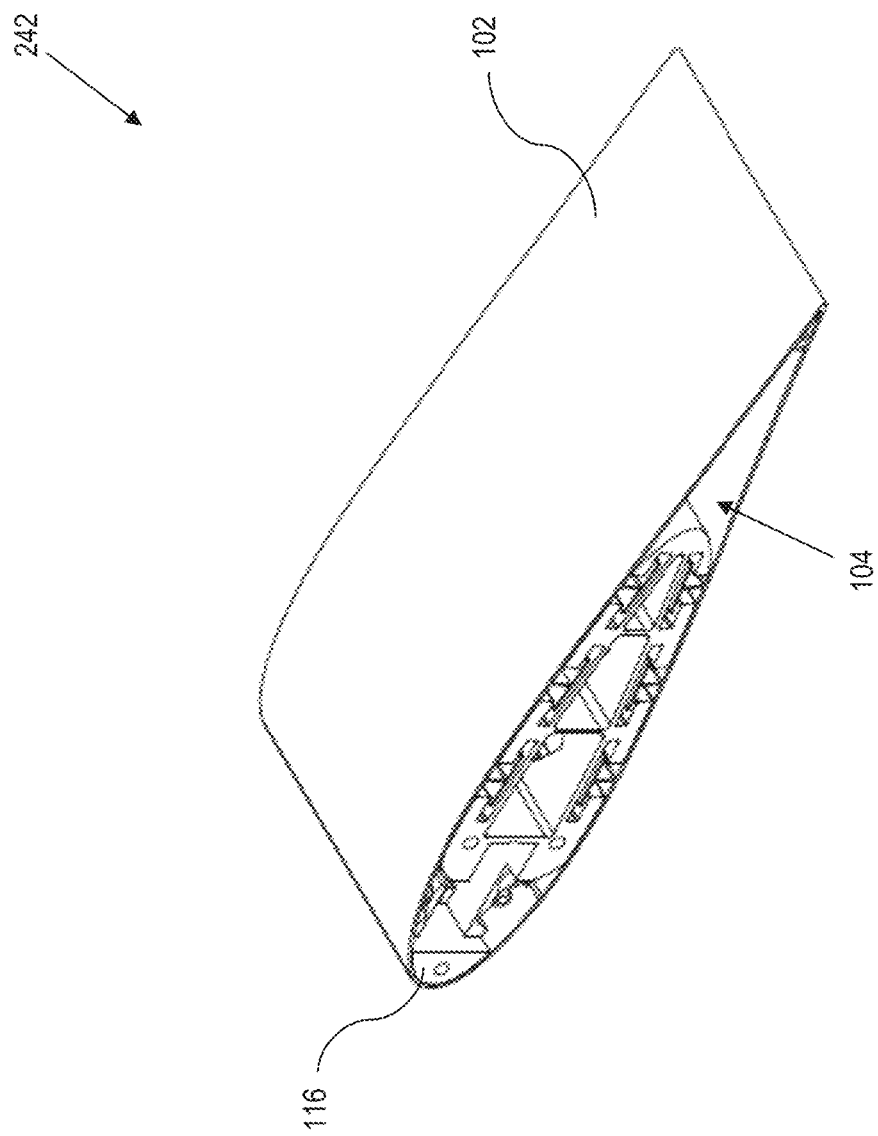
FIG. 2 is an isometric view of a segment of a wing, according to various aspects of the present disclosure.

FIG. 2 illustrates a segment 242 that may be used to create an embodiment of the wing 100 of FIG. 1. Similar to the wing 100 of FIG. 1, the segment has a skin 102 with an interior 104 (among other things). The interior 104 of the skin 102 includes a latching structure 106 coupled to the interior 104. Further, the latching structure 106 includes a T-shaped structure 108. While the embodiment of FIG. 1 includes six T-shaped structures 108, any number of T-shaped structures 108 may be used. The T-shaped structures 108 include a stem 110 and a crossbar 112.

Moreover, a rigid leading edge structure 116 is disposed within the interior 106 of the skin 102. The rigid leading edge structure 116 includes T-shaped hollows 118 that correspond to the T-shaped structures 112 (including a stem hollow 120 and a cross hollow 122), including enough room for the T-shaped hollows 118 to deform. Further, the insert structure 116 includes a first rod mount 124 and a second rod mount 126 that provide space for a first rod 128 and a second rod 130. The rods 128, 130 are coupled to a first motor (e.g., a servo motor) that is mounted to a mounting area 132. In some embodiments, a second motor is also mounted to the mounting area 134 and couples to the first and second rods 128, 130. The motors rotate the rods 128, 130 around a point 134, resulting in skin 102 actuation and enabling the change of a camber of the segment 242 of the wing, such that an effective camber of the segment 242 of the wing can be achieved up to five degrees in either direction. Note that the amount that the motors rotate the rod is related to the change in camber of the wing (not necessarily a 1:1 relationship).

The rigid leading edge structure 116 along with the T-shaped structures 108 and T-shaped hollows 118 evenly distribute the change of camber, which prevents the skin 102 from detaching or buckling (inward, outward, or both) without adding extra thickness to the skin 102.

Further, the rigid leading edge structure 116 keeps a leading edge of the skin 102 rigid and dictates where the skin 102 begins to deform when there is a change in camber. Also, the rigid leading edge structure 116 includes mounting holes 138 to mount the segment 242 to a device (e.g., a fuselage of an aircraft; rotor; another segment of the wing; a test block, etc.).

The components of the segment 242 of the wing work similarly to the components of the entire wing (100, FIG. 1) to prevent buckling of the skin 102.

Figure 3:
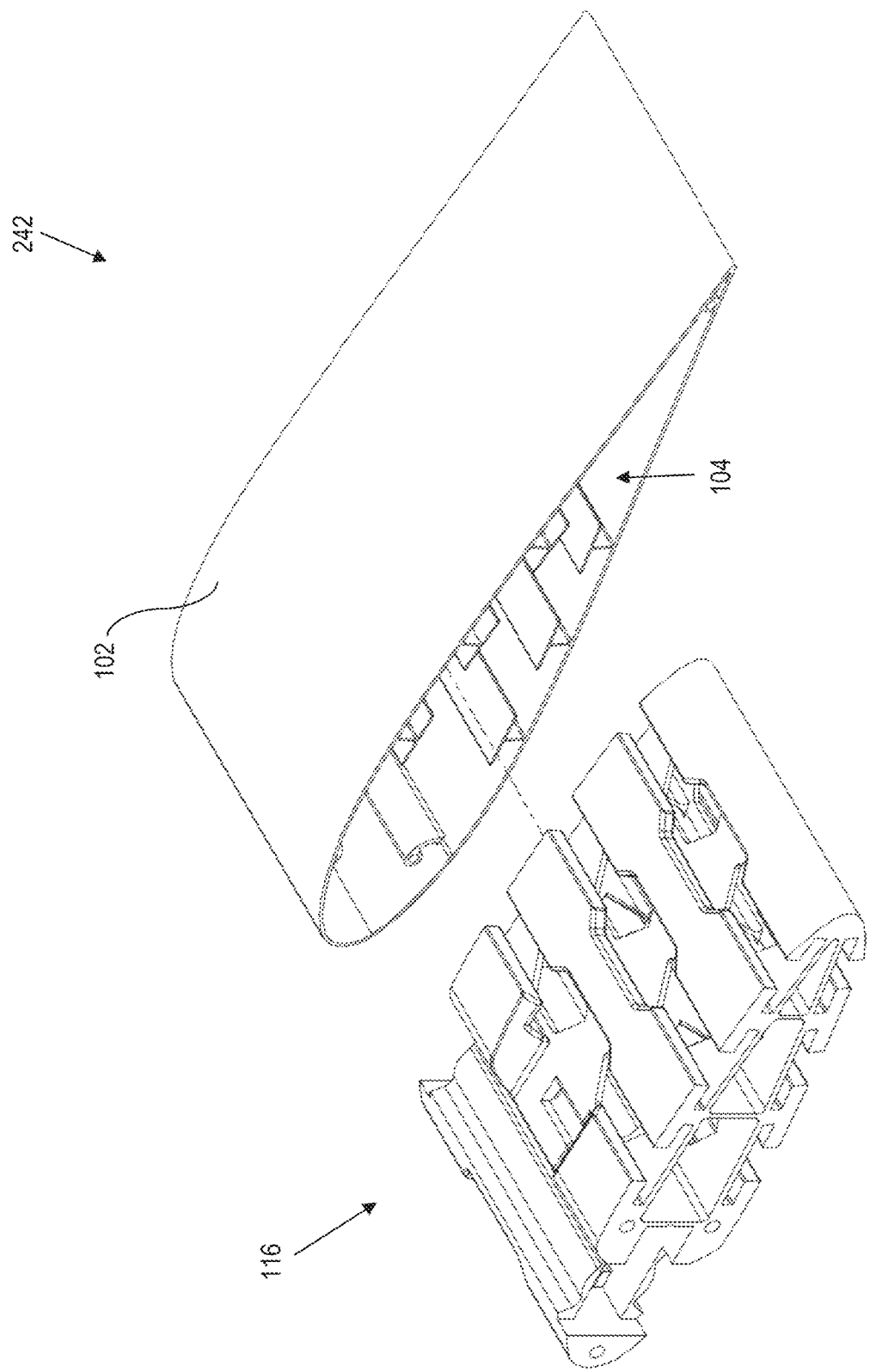
FIG. 3 is an isometric exploded view of the wing of FIG. 2, according to various aspects of the present disclosure.

FIG. 3 illustrates two major pieces of the segment 242 of FIG. 2: the skin 102 and the rigid leading edge structure 116 isometrically in an exploded view.

FIG. 4 illustrates a segment 242 of the wing, where there is a zero-degree rotation of the motors, resulting in a zero degree camber of the wing. Note the spacing between the T-shaped structures 108*a-f* and the T-shaped hollows 118*a-f*.

FIG. 5 illustrates the segment 242 of the wing of FIG. 4, where there is a 20-degree rotation of the motors, resulting in a 4.98 degree camber of the wing. Note that the T-shaped structure 108*b* makes contact with the T-shaped hollow 118*b*, along with another T-shaped structure 108*d* making contact with the T-shaped hollow 118*d*. These structures making contact prevent the skin 102 from buckling.

FIG. 6 illustrates the segment 242 of the wing of FIG. 4, where there is a 30-degree rotation of the motors, resulting in a 6.20 degree camber of the wing. Note that the T-shaped structure 108*b* makes contact with the T-shaped hollow 118*b*, along with another T-shaped structure 108*d* making contact with the T-shaped hollow 118*d*. These structures making contact prevent the skin 102 from buckling.

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A wing comprising:
   an airfoil shaped skin, the skin including:
      a length; and
      an interior;
   a latching structure coupled to the interior of the skin, wherein the latching structure includes a T-shaped structure;
   a first motor coupled to:
      a first rod that spans at least a portion of the length of the skin, wherein the first rod is near a top of the skin; and
      a second rod that spans at least a portion of the length of the skin, wherein the second rod is near a bottom of the skin; and
   a rigid leading edge disposed in the interior of the outer skin, wherein the rigid leading edge includes:
      a T-shaped hollow corresponding to the T-shaped structure of the latching structure, which limits the skin from buckling when the first motor is activated.

2. The wing of claim 1, further comprising:
   an electronic controller coupled to the first motor.

3. The wing of claim 1 further comprising a second motor coupled to the first rod and the second rod.

4. The wing of claim 3, further comprising:
   an electronic controller coupled to the first motor and the second motor.

5. The wing of claim 4, wherein the electronic controller controls the first motor independently of controlling the second motor.

6. The wing of claim 1, wherein:
   the T-shaped structure includes a stem and a crossbar; and
   the T-shaped hollow includes a stem hollow and a cross hollow.

7. The wing of claim 1, wherein when movement of the first motor causes the wing to morph in shape, the T-shaped structure and the T-shaped hollow interact to restrict movement of the skin.

8. A segment of a wing comprising:
   an airfoil shaped skin, the skin including:
      a length; and
      an interior;
   a latching structure coupled to the interior of the skin, wherein the latching structure includes a T-shaped structure;
   a first motor coupled to:
      a first rod that spans at least a portion of the length of the skin, wherein the first rod is near a top of the skin; and
      a second rod that spans at least a portion of the length of the skin, wherein the second rod is near a bottom of the skin;
   a rigid leading edge disposed in the interior of the outer skin, wherein the rigid leading edge includes:
      a T-shaped hollow corresponding to the T-shaped structure of the latching structure, which limits the skin from buckling when the first motor is activated.

9. The segment of a wing of claim 8, further comprising:
   an electronic controller coupled to the first motor.

10. The segment of a wing of claim 8 further comprising a second motor coupled to the second rod.

11. The segment of a wing of claim 8, wherein the second motor further couples to the first rod.

12. The segment of a wing of claim 11, further comprising:
    an electronic controller coupled to the first motor and the second motor.

13. The segment of a wing of claim 12, wherein the electronic controller controls the first motor independently of controlling the second motor.

14. The segment of a wing of claim 8, wherein:
    the T-shaped structure includes a stem and a crossbar; and
    the T-shaped hollow includes a stem hollow and a cross hollow.

15. The segment of a wing of claim 8, wherein when movement of the first motor causes the wing to morph in shape, the T-shaped structure and the T-shaped hollow interact to restrict movement of the skin.

16. The segment of a wing of claim 8, wherein the rigid leading edge structure includes a mounting hole.

* * * * *